Oct. 18, 1927.  1,645,715
A. S. NORTHRUP
FLEA AND INSECT TRAP
Filed March 2, 1926  2 Sheets-Sheet 1

Inventor
Annabelle S. Northrup,
By
Attorney

Oct. 18, 1927.  1,645,715
A. S. NORTHRUP
FLEA AND INSECT TRAP
Filed March 2, 1926    2 Sheets-Sheet 2

Inventor
Annabelle S. Northrup,

Patented Oct. 18, 1927.

1,645,715

UNITED STATES PATENT OFFICE.

ANNABELLE S. NORTHRUP, OF NORFOLK, VIRGINIA.

FLEA AND INSECT TRAP.

Application filed March 2, 1926. Serial No. 91,787.

This invention relates to insect traps.

A primary object is to provide a device adapted to detachably hold bait carriers such as paper or the like covered or saturated with prepared bait.

Another object is to provide an insect trap having means for supporting a plurality of the bait carriers so as to be readily accessible to the insects, and which may be individually removed and replaced without disturbing the others. In that connection it is also proposed to provide a construction that may be readily disassembled for applying and removing bait, cleaning and other purposes.

Still another object of the invention is to provide a light but comparatively rigid supporting structure for the bait having a maximum area on which the insects may light and feed thereby rendering changing of the bait holders unnecessary except at comparatively long intervals.

With the above and other objects in view which will more readily appear as the nature of the invention is better understood, the same consists in the novel construction, combination and arrangement of parts hereinafter more fully described, ilustrated and claimed.

Preferred and practical embodiments of the invention are shown in the accompanying drawings, in which.

Similar reference characters designate corresponding parts throughout the several figures of the drawings.

In carrying the invention into effect it is proposed to utilize a comparatively light, rigid supporting structure for the bait carriers which while having sufficient stiffness to prevent its collapse will yet be pliable enough to permit parts thereof to be folded to operate as retainers for the bait holding sheet.

Figure 1:
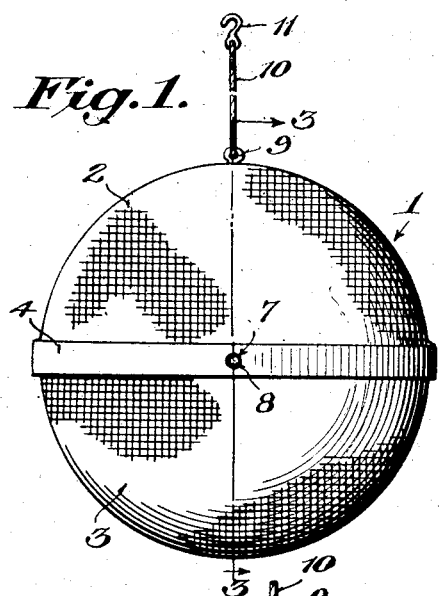
Figure 1 represents a side elevation of one form of the invention ready for use.
Figure 2:
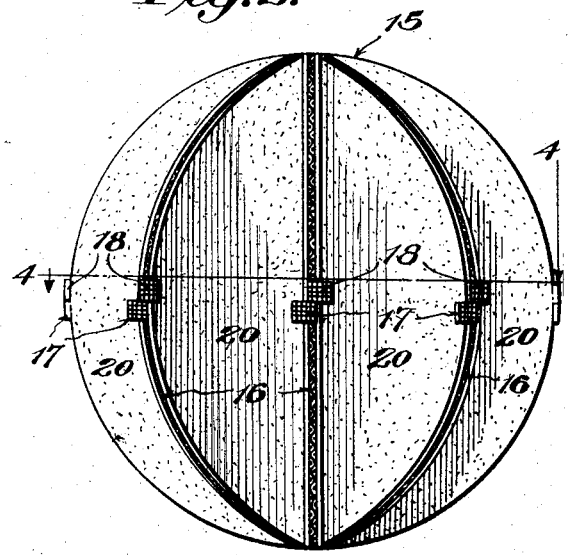
Fig. 2 is a similar view with the casing removed.
Figure 3:
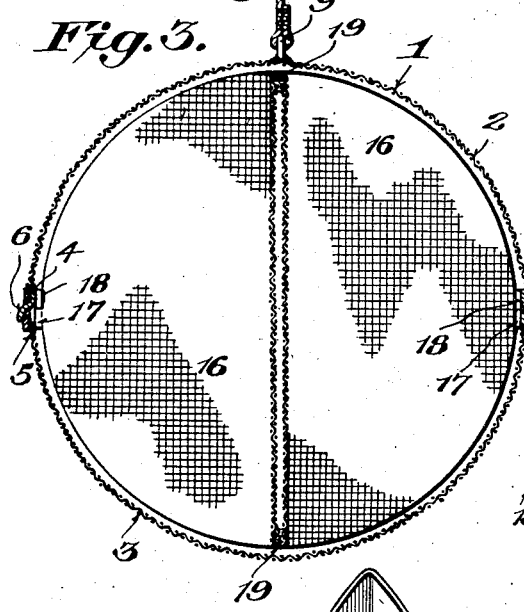
Fig. 3 is a vertical section taken on the line 3—3 of Fig. 1.

In the embodiment illustrated in Figs. 1 to 5 the trap illustrated generally as 1 may be of any desired configuration being shown spherical in these figures. In this form of the invention the trap comprises a perforate casing composed of detachably connected sections 2 and 3 shown in this form of the invention as hemispherical with their edges bound by metal bands 4 and 5 which telescopically engage as shown in Fig. 3 and which are connected by a hinge 6 at one side and at the opposed side by a catch here shown in the form of an opening 7 in the outer band 4 to receive a projection or button 8 carried by the inner band 5, (see Fig. 3). The casing 1 is designed to be suspended from any suitable support and is shown equipped with an eye 9 to receive a suspension cord 10 having a hook 11.

The casing 1 is composed of suitable perforate material preferably of wire mesh the mesh being sufficiently large to permit the ingress of the insects to be trapped. The mesh of this trap is to be made of soft metal wire soldered at all intersecting points and is about one-sixteenth of an inch in diameter, the mesh being spaced about one-quarter of an inch apart.

Figure 4:
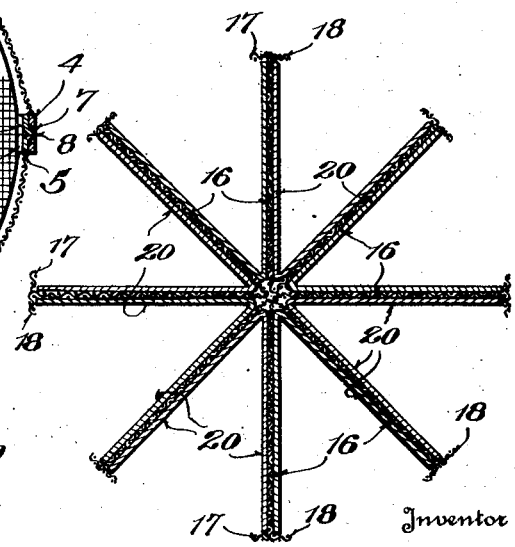
Fig. 4 is a horizontal section taken on the line 4—4 of Fig. 2.

Adapted to be enclosed within the casing 1 is a bait holding structure 15 which conforms in configuration to the casing 1 being here shown spherical. This bait supporting member is composed of a plurality of pliable metal disks folded along their median lines to provide wings substantially V-shaped in cross-section as shown in Fig. 4 and which are numbered 16. Any desired number of these disks may be employed, eight being here shown, and they may be constructed of any suitable material sufficiently rigid to prevent collapse and yet pliable enough to permit bending. As shown these plates are made of screen wire and are provided at their edges with retaining tabs 17 and 18 extending in opposite directions and which are designed to be bent down over the adjacent edges of the bait holding sheets 20 to hold them securely in operative position and yet permit their ready removal or replacement when necessary.

The bait holder supporting wings 16 have their folded edges arranged in contact as shown in Fig. 4 and are soldered together at their upper and lower ends as shown at 19 forming a central core from which the wings radiate. The wings 16 are preferably spaced equal distances apart but not necessarily so. It is of course understood that the member 15 is to be slightly smaller than the casing 1 to permit its ready insertion within the casing. Obviously the bait holder 15 may be used without the casing when found desirable to do so and when so used suitable means of support is provided therefor an eye 12 being shown for connection of the suspension cord, not shown.

Figure 5:
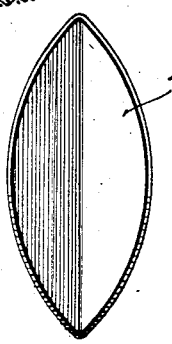
Fig. 5 is a detail front view of one of the bait holders detached.

The bait containers 20 which are carried by the wings 16 are preferably made of absorbent paper disks folded intermediate their length as shown clearly in Fig. 5 and to which the bait to be used is applied, the disk being preferably impregnated with the bait which is of a sticky character as well as having insect attracting properties so that when they alight on the disk 20 they will adhere thereto in a manner similar to the trapping of flies by "Tanglefoot."

It will thus be readily seen that any one of the bait carrying paper disks 20 may be individually removed from the member 15 without disturbing any of the others such removal being accomplished simply by bending back the tabs 17 and 18 and lifting out the paper disk which may be replaced by another and clamped in position by bending down the tabs.

When the bait holding member 15 is encased within the wire mesh casing 1 it need not necessarily be sticky so that when the insects pass into said casing and feed on the bait they will be poisoned and drop down dead into the casing where they will be held until removed.

While the trap shown in Figs. 1 to 5 is made spherical it obviously may be of any other desired configuration, this spherical form being especially adapted for catching fleas and winged insects.

Figure 6:
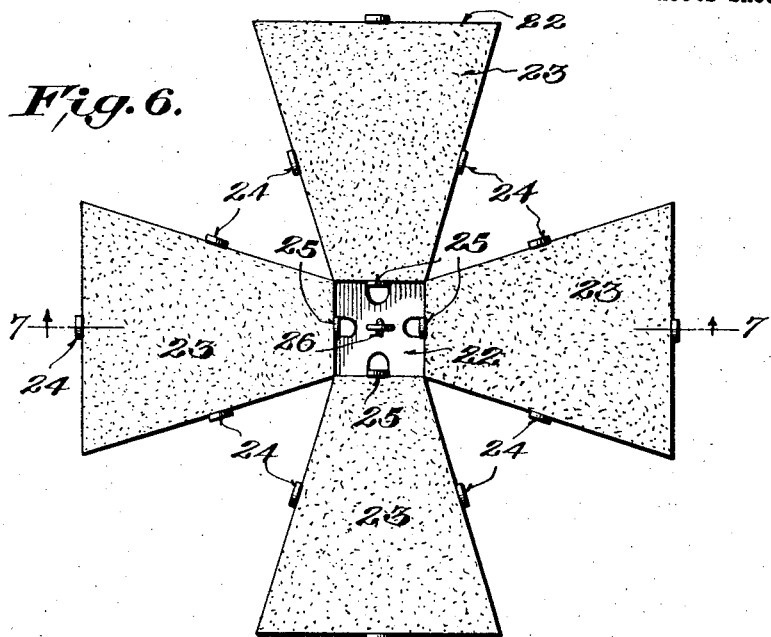
Fig. 6 is a plan view showing another form of the invention.
Figure 7:
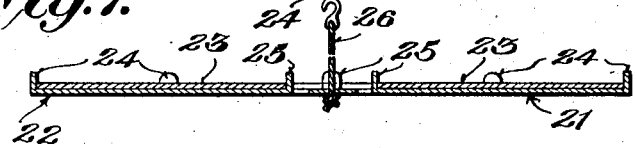
Fig. 7 is a transverse section taken on the line 7—7 of Fig. 6.

In the form shown in Figs. 6 and 7 a base plate 21 made of sheet aluminum or any other suitable material and which may be of any desired configuration being here shown in the form of a Greek cross, has mounted on the arms or wings 22 thereof correspondingly shaped bait carrying elements 23 preferably made of absorbent paper and which are held in position on the base plate by upstanding clamping lugs or tabs 24 any desired number of which may be employed, four being here shown for each wing, three along the side edges and one struck out from the center of the plate as shown at 25. A suspension cord 26 is shown secured to the center of the plate 21 for mounting the trap in any desired position. While this suspension cord is shown obviously the trap may be supported otherwise if desired.

Figure 8:
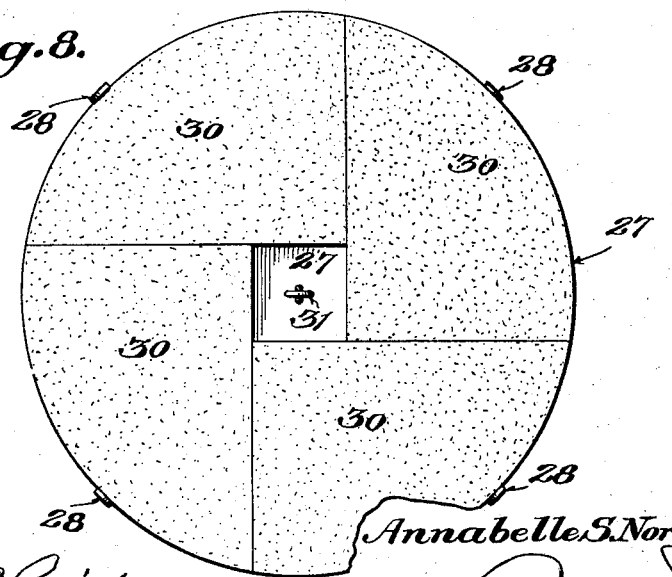
Fig. 8 is a plan view showing still another form of the invention.

In the form shown in Fig. 8 the trap is made in the form of a circular supporting plate or base 27 having upstanding peripheral lugs 28 sufficiently pliable to be bent for holding in position on the plate paper bait carrying elements 30 which are here shown in the form of mutilated sectors arranged to cover the upper surface of the plate except at the center thereof. An eye 31 is shown projecting upwardly from the center of the plate 27 for the attachment of a suspension cord when it is found desirable to so support this trap.

The flat form of trap shown in Figs. 6 to 8 is especially designed for ensnaring roaches, ants, bedbugs and the like and may be placed in the corners of beds and such like places to attract the insects to be ensnared.

Without further description it is thought that the features and advantages of the present invention will be readily apparent and it will of course be understood that minor changes may be resorted to within the scope of the appended claims without departing from the spirit of the invention.

I claim:

1. A spherical insect trap comprising a supporting structure including a plurality of radiating wings having oppositely extending pliable clamping tabs, and bait carrying elements to be mounted on said wings and secured by said tabs.

2. An insect trap comprising a plurality of connected wings radiating from a central point and substantially V-shaped in cross-section, bait carrying elements mounted on said wings and conforming in shape thereto, and clamping means for securing said plates to said wings.

3. A spherical insect trap comprising an open mesh casing composed of detachably connected hemispherical sections, and a skeleton supporting member mounted in said casing and provided with bait carrying members.

4. An insect trap comprising a plurality of circular members of open mesh material folded diametrically and assembled to provide a spherical structure having a plurality of radiating walls, means on the circular members forming the walls for holding a bait carrier therein, and hemispherical open mesh sections surrounding said members forming the walls.

In testimony whereof I hereunto affix my signature.

ANNABELLE S. NORTHRUP.